3,495,894
OPTICAL BEAM DEFLECTION UTILIZING
LiNbO₃ OR LiTaO₃
Pascal V. Lenzo, Warren Township, Somerset County, Kurt Nassau, Bernardsville, and Edward G. Spencer, Berkeley Heights, N.J., assignors to Bell Telephone Laboratories, Incorporated, New York, N.Y., a corporation of New York
Continuation-in-part of application Ser. No. 483,259, Aug. 27, 1965. This application Dec. 28, 1965, Ser. No. 516,986
Int. Cl. G02f 1/28
U.S. Cl. 350—161                                7 Claims

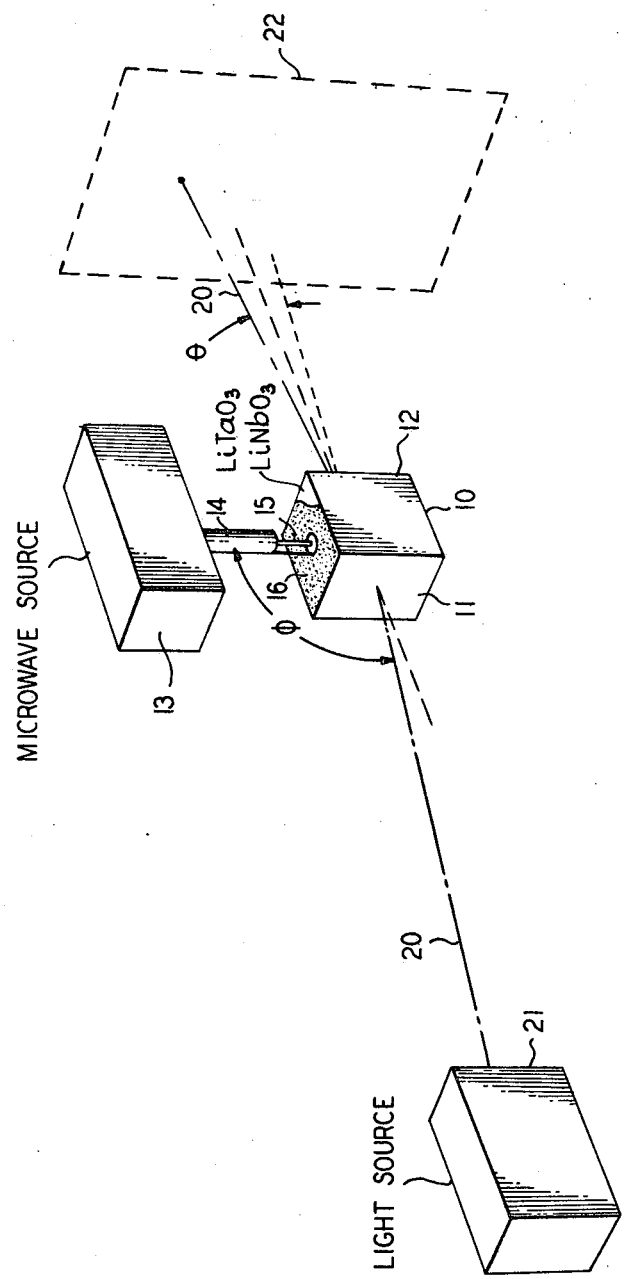

ABSTRACT OF THE DISCLOSURE

The use of a single crystal material selected from the group consisting of lithium metaniobate and lithium tantalate in a Debye-Sears type of elasto-optic deflector is disclosed. These materials have a much higher combination of piezoelectric, elastic wave transmission and elasto-optic constants at microwave frequencies than do materials previously used.

---

This invention relates to optical beam deflection systems and, more particularly, to the use of a body of lithium metaniobate or lithium tantalate in compact optical deflectors of the Debye-Sears type for use in memories, logic, switching, modulation and other optical arrangements and is a continuation-in-part of application Ser. No. 483,259, filed Aug. 27, 1965, and now abandoned.

With the advent of the optical maser and its highly coherent optical frequency beam, considerable attention has been given to the problem of deflecting a light beam in response to an electrical control signal. One form employs an acoustical diffraction grating, similar to the Debye-Sears cell of classical optics, in which a light transparent, homogeneous, piezoelectric medium is disturbed by the passage of electrically excited elastic waves to produce a periodic variation of the index of refraction of the medium. Light directed through the medium is diffracted as a function of the ratio of the wavelength of light to the wavelength of the elastic wave.

The efficiency of such a device depends in the first instance upon the coupling produced between the initial electrical signal and the elastic wave by way of the piezoelectric properties in the medium, then upon the elastic wave transmission properties of the medium and, finally, upon the coupling between the elastic wave and the optical signal by way of its elasto-optic properties. These multiple requirements have severely limited the choice of suitable materials and particularly so in the frequency ranges of microwave signal energy.

In accordance with the present invention, it has been discovered that lithium metaniobate (LiNbO₃) or lithium tantalate (LiTaO₃) which have heretofore been known as ferroelectric crystals of trigonal symmetry, have the surprising combination of piezoelectric, acoustic and optical properties, that make them substantially superior to previously employed materials such as quartz and titanium dioxide.

The objects, the nature of the present invention, its various features and advantages, will appear more fully upon consideration of the illustrative embtodiment now to be described in connection with the accompanying drawing which shows partly in schematic and partly in perspective an optical system including a lithium metaniobate deflector.

Referring more particularly to the drawing, an illustrative embodiment of a light deflector is shown in which the active medium of the deflector comprises a block 10 formed from material selected from the group consisting of lithium metaniobate having a chemical composition LiNbO₃ or lithium tantalate having a chemical composition LiTaO₃. These materials have been discovered to have, at frequencies in the microwave range, high piezoelectric constants, high elasto-optic coupling coefficients, and high acoustical Q's, that is, a low elastic wave transmission loss, the combination of which makes them substantially superior to previously known materials at these frequencies.

In particular the lithium niobate is preferably prepared according to the alternative processes described in the copending applications of the inventor Nassau hereof and others, as by melt growth in Ser. No. 471,157 and as by electrical poling in Ser. No. 471,240, both filed July 12, 1965. Lithium tantalate can be prepared according to a process analogous to the poling process for lithium niobate. These processes produce single domain crystals which are preferred for the purposes of the invention because of their high optical transparency. While not critical, it is preferred that opposing parallel faces 11 and 12 of block 10 be normal to the single crystal trigonal axis, which is also the optical axis, and that both faces be polished optically flat. Ceramic forms of either material may be employed with some loss in transparency in which case the material axis is not significant.

The piezoelectric properties of block 10 are employed to generate an elastic wave at microwave frequencies within block 10, propagating in a direction therein parallel to faces 11 and 12. As disclosed by H. E. Bommel et al., in Patent 3,037,174, an electric field gradient at microwave frequencies is set up across a surface of block 10 such that the piezoelectric response of the material of block 10 generates an elastic wave propagating normally away from the excited surface and parallel to the polished surfaces 11 and 12. While microwave cavities are disclosed by Bommel and numerous other equivalents will occur to those skilled in the art, it is sufficient for the purposes of the present invention, that the microwave energy be applied from source 13 by way of coaxial conductor 14 to a probe 15 contacting one point on the top surface of block 10 which is normal to surface 11 and 12 thereof and parallel to the trigonal axis therethrough. The outer conductor of coaxial 14 is connected to a suitable conductive ground plane, spaced from and at least partially surrounding probe 15. This ground plane may be a conductive metallic coating 16 applied directly to block 10 or the ground plane may be the conductive body of a jig (not shown) which supports block 10.

The optical system is schematically illustrated comprising a source 21 of a collimated light beam 20, such as an optical maser. Beam 20 is directed through one of the polished surfaces 11 at an angle of incidence $\phi$ to the elastic wave path in body 10 and emerges through the other surface 12 to impinge upon object plane 22.

The system thus described is a light beam deflector of general application. As such, object plane 22 would constitute an array of light-sensitive storage devices, an array of photo-sensitive switching elements, a coding plate or an array of other optical devices. In operation the invention utilizes a form of the well-known Debye-Sears diffraction phenomenon, an analysis of which may be found in any standard optical textbook, for example, see chapter XII, "Principles of Optics," Born & Wolf, 1964, or P. K. Tien, Patent 3,174,044, Mar. 16, 1965. Briefly, an elastic wave is generated piezoelectrically at probe 15 in body 10 by the electrical signal from source 13. Provided the elastic wave transmission losses of body 10 are small and its acoustical Q is high, the wave travels transversely through the body. Provided further that the body has sufficient elasto-optic properties, the elastic wave sets up a periodic variation in the index of refraction of the medium. Finally, if the medium is sufficiently transparent to beam 20, the beam will be diffracted to produce a first order lobe defined by the relationship $$\cos \phi = \lambda_L / 2\lambda_s \quad (1)$$

where $\phi$ is the diffraction angle measured from the plane of the grating as defined above, $\lambda_L$ is the wavelength of the light and $\lambda_s$ is the grating spacing equivalent to the elastic wavelength at the frequency of the microwave energy from the source 13. As a result the first order lobe is deflected from the main beam by the angle $\theta$ wherein $\sin \theta/2 = \cos \phi$.

It is thus seen that transition from an electrical signal from source 13 into a usable deflection of beam 20 involves at least three separate parameters of the material of block 10 at high frequencies and that a deficiency in any one of these would severely limit the performance of the invention. In general, materials having known high piezoelectric coupling are too soft to exhibit high acoustic Q and high piezo-optic coupling. Other materials such as Rutile (titanium dioxide) are known to exhibit high acoustical Q and high piezo-optic coupling but are not piezoelectric. Only quartz has been previously recognized as having acceptable coefficients for all three properties. Both lithium metaniobate and lithium tantalate in accordance with the invention have been determined to exhibit piezo-optic coupling at least as high as quartz and to have acoustic Q's at 1000 megacycles ten times that of quartz. In addition both materials have a piezoelectric coupling at these microwave frequencies which can be as high as 50 percent as compared to that of quartz which can be as high as 10 percent. It is important to note that the coefficients of interest are those exhibited at microwave frequencies and should not be confused with direct current effects sometimes referred to by the same names in the art.

In the copending application of the inventors Spencer and Lenzo hereof, now Patent 3,433,958, issued Mar. 18, 1969, the principles of the present invention are applied with particular advantage to a system in which the diffraction medium serves both as a frequency changer and as a deflector to detect the intelligence upon a particular microwave frequency subcarrier which in turn is modulated along with other microwave subcarriers upon the optical beam.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A high frequency Debye-Sears cell comprising a body of material selected from the group consisting of lithium metaniobate LiNbO$_3$ and lithium tantalate LiTaO$_3$, and means for producing an electric field gradient at microwave frequencies across a surface of said body.

2. A light beam deflecting arrangement comprising a body of material selected from the group consisting of lithium metaniobate LiNbO$_3$ and lithium tantalate LiTaO$_3$, means for directing said light beam through said body, and means for producing an electric field gradient at microwave frequencies across a surface of said body.

3. A light beam deflecting arrangement according to claim 2 wherein said means for producing said electric field gradient includes a source of microwave frequency electromagnetic wave energy and means for producing a gradient of said energy across a surface of said body that is parallel to the direction of said light beam through said body.

4. A light beam deflecting arrangement according to claim 2 wherein said body is a single crystal and wherein said direction of said light beam through said crystal is parallel to the trigonal axis thereof.

5. A light beam deflecting arrangement comprising a body of material selected from the group consisting of lithium metaniobate LiNbO$_3$ and lithium tantalate LiTaO$_3$, means for directing said light beam through said body in a given direction, and means for producing a diffraction grating within said body having a periodic variation of the index of refraction at microwave frequencies, said last named means including a source of microwave frequency electrical energy applied to a surface of said body to produce an electric field gradient across said surface and to generate therein an elastic wave propagating normal to said given direction.

6. A light beam deflecting arrangement according to claim 5 wherein said last named means further includes a conductive probe connected to said microwave source and contacting a point on one surface of said body and a conductive ground plane spaced on said surface from said probe.

7. A light beam deflecting arrangement comprising a body of material selected from the group consisting of lithium metaniobate LiNbO$_3$ and lithium tantalate LiTaO$_3$, means for directing said light beam through said body, and means for producing an elastic wave at microwave frequencies within said body whereby said elastic wave and said light beam interact elasto-optically.

References Cited

UNITED STATES PATENTS

| | | | |
|---|---|---|---|
| 2,836,652 | 5/1958 | Sprague | 350—160 |
| 3,262,058 | 7/1966 | Ballman et al. | 350—160 |
| 3,357,771 | 12/1967 | Buhrer et al. | 350—160 |
| 3,363,103 | 1/1968 | Fowler et al. | 350—160 |

JEWELL H. PEDERSON, Primary Examiner

WILLIAM L. SIKES, Assistant Examiner

U.S. Cl. X.R.

332—7.51